United States Patent [19]
Pepper et al.

[11] 3,859,114
[45] Jan. 7, 1975

[54] METHOD OF COATING GLASS FIBERS WITH LEAD

[75] Inventors: Roger T. Pepper, Palos Verdes Peninsula; Ernest G. Kendall, El Segundo, both of Calif.

[73] Assignee: Aerospace Corporation, Los Angeles, Calif.

[22] Filed: Aug. 15, 1972

[21] Appl. No.: 280,814

[52] U.S. Cl.................... 117/47 R, 65/3, 117/54, 117/71 R, 117/114 R, 117/126 GM
[51] Int. Cl...................... C03c 25/00, C03c 25/02
[58] Field of Search .......... 117/126 GM, 54, 124 C, 117/114 R, 71 R, 51, 47 R, 169, 100 S; 161/93, 96; 29/182, 182.5; 106/1, 47; 65/3; 156/134, 24

[56] References Cited
UNITED STATES PATENTS

| | | | |
|---|---|---|---|
| 3,047,409 | 7/1962 | Slayter et al............. | 65/3 |
| 3,076,324 | 2/1963 | Morgan................... | 65/3 |
| 3,375,155 | 3/1968 | Adams..................... | 65/3 |

*Primary Examiner*—Charles E. Van Horn
*Assistant Examiner*—Michael W. Ball
*Attorney, Agent, or Firm*—Francis R. Reilly

[57] ABSTRACT

Glass fibers, glass cloth and glass tape are treated in a liquid sodium bath and thereafter immersed in and removed from a molten lead bath. The sodium conditions the glass thereby permitting the lead to wet the glass surface and upon cooling the lead film or coating on the glass is firmly bonded thereto. A high strength glass reinforced lead composite and lead coated glass fibers are produced.

5 Claims, No Drawings

METHOD OF COATING GLASS FIBERS WITH LEAD

BACKGROUND OF THE INVENTION

1. Field of the Invention

The present invention relates to a glass fiber-lead composite prepared by pretreating the glass fiber in liquid sodium and then coating the fiber with lead by immersion in liquid lead.

2. Description of the Prior Art

Lead and lead alloys are variously used in industry particularly in lead-acid batteries, bearings, ducting and containers for certain corrosive chemicals with which lead does not react. Lead is also used as a protective coating for glass fibers to prevent them from abrading each other in working, tension bearing applications of glass fiber ropes, cords, yarns and fabrics.

The use of structural parts and components of pure lead, or alloys of which lead is the principal constituent, has its limitations and drawbacks because of the high density of lead, its low tensile strength and inelasticity. A particularly attractive mode of improving these features of lead is by forming a composite of a lead matrix reinforced by internally dispersed light weight, high tensile strength inexpensive glass fibers. Unfortunately the surface of glass fibers is not normally wetted by molten lead and thus the necessary bond is not established between the two components. In the absence of the bond there can be no transmission of loads from the lead to the fibers along their longitudinal axis. The necessity of this bond is well recognized as a requirement in all reinforced composites.

When lead is applied as a protective coating to glass fibers good adherence is similarly of importance. Any poorly bonded coating is susceptible to flaking and peeling. A general discussion of the utility of lead, and other metallic coatings on glass fiber is set out in U.S. Pat. No. 3074256 issued Jan. 22, 1963. In this patent the metal protective coating is applied to the fibers without any pretreatment of the fiber surface to assure good adhesion.

SUMMARY OF THE INVENTION

In accordance with the present invention, glass fibers, yarns, filaments and woven fabrics are precleaned of binders, subjected to the action of liquid sodium or sodium mist and then immersed or passed through a bath of molten lead. Upon removal from the molten lead, the fibers retain a lead coating that solidifies upon cooling below its melting point.

The process of this invention is utilized to make lead coated fibers or filaments wherein the lead coating protects the glass from self-abrasion when multi-filament strands are employed in working, tension bearing applications.

In other applications where lead is the primary constituent of the lead-glass composite, a woven fabric of glass fibers is treated in accordance with the process of the invention. Upon withdrawal from the molten lead bath the lead component can be made greater than 50 volume percent of the composite. In similar applications where only uniaxial fiber reinforcement is desired, any required number of individual lead coated fibers are bundled in parallel relation and bonded together under pressure and heat. Alternatively a group of pretreated fibers can be arranged and held in a close parallel pattern and then as a unit be immersed in molten lead to thus form a reinforced composite.

It is a purpose of this invention to provide an effective treatment of the surfaces of glass fibers to render them wettable by molten lead so that upon solidification of the fiber surface retained lead, a strong bond between the materials renders them integral. By this process the bond between the lead and the glass enables loads applied axially of the fibers to be borne by the fibers thereby relieving the lead of significant deforming strains. Thus there is produced a component having all desirable external physical and chemical properties of lead with the internal strength of glass, principally tensile strength and creep resistance.

Other features and applications of our invention will be apparent to its users in their adaptation of the invention to their particular needs. As for example, the lead may be alloyed with other metals as calcium, tellurium, antimony, tin and others to enhance the coating in accordance with the specifics of its specific application. It is to be understood that these adaptations are within the spirit of our invention which is limited only by the scope of the appended claims.

DESCRIPTION OF THE PREFERRED EMBODIMENTS

The fibers utilized in the present invention may be any of the various commerical types, such as E-glass, S-2 glass or quartz glass. Depending on the particular application, yarns, monofilaments or fabrics of the glass are employed. The metallic material used in conjunction with the fibers is commercially pure lead or a lead alloy.

It is the frequent practice of glass fiber producers to coat the fibers with a starch-oil protective binder or lubricant to prevent damage by abrasion when adjacent strands rub each other in spooling or reeling and in subsequent handling. As such binders would hinder the adherence of lead to the glass fibers they are removed in a first pretreatment. It is also desirable to remove the binders since they would contaminate the bath in a subsequent process step. These binders are readily removed by immersion in a detergent solution followed by further cleansing and drying in flowing air or oxygen at about 350°C. for approximately one half hour.

Certain other commercial glass fibers are available with finishes which, unlike the starch-oil binder, are compatible with the present invention process and need not be removed. Fibers with such finishes should however be cleaned to remove foreign matter as by an alcohol rinse or by heating in an oxygen containing atmosphere, at about 350°C. for approximately one half hour, or by both rinsing and heating.

After precleaning the glass fiber is immersed in a bath of liquid sodium in an inert or vacuum atmosphere. Sodium melts at about 98°C. but it has been found that a more efficient action by the sodium is obtained by heating the sodium to a temperature in excess of 250°C. In no event however should the glass fibers be subjected to the liquid sodium at temperatures above 450°C. whereat the fibers are attacked or degraded and subsequently dissolve in the lead bath. The heated sodium bath serves to dissolve or react away all adsorbed moisture and gases in the glass fibers. The sodium further is believed to react with surfaces of the glass fibers in a manner that is presently not fully known. It appears that sodium atoms may attach themselves to oxygen or hydroxyl groups in the glass. There is also the likelihood that the glass surface is mildly etched by the sodium. It has been discovered that for satisfactory results the glass fibers may be immersed in the sodium bath for as little as 1 minute. More uniform results are obtained if this time is increased to between 8 and 10 minutes. After removal from the sodium bath the glass fibers are preferably stored until further processing in an inert dry environment to protect the fibers from contamination.

As an alternate to a liquid sodium bath the fibers may be subjected to a misty sodium atmosphere. It is apparent though that the sodium mist treatment will involve a longer time to produce results equivalent to the sodium immersion.

After the sodium bath the fibers are transferred into a second bath of liquid lead or lead alloy in an evacuated chamber. The lead is maintained at an elevated temperature not substantially above the melting point of 327°C. By virtue of its pretreatment in sodium it was discovered that lead readily wets the surfaces of the glass fibers. On removal from the lead bath a film of lead adheres to the glass cloth and solidifies upon cooling. The coated glass is about 50 volume percent lead. A thinner lead coating is obtainable by pressure rollering the fibers after removal from the lead and while the lead is still in molten state.

The lead coating step of the process may be performed in an inert atmosphere. The lead bath may also be agitated to assure full penetration into the space between fibers of glass cloth and tape. Agitation is not critical since many specimen of glass tape were lead coated without agitating the bath and equally acceptable results were obtained.

EXAMPLE 1

A specimen of boatweave (coarse) fabric of E-glass coated with a starch-oil binder approximately 1 inch wide and 5 inches long was soaked in an ultra sonically agitated detergent water bath for one-half hour. The specimen was then placed in oxygen heated to 350°C. and baked for one half hour. Under a vacuum the specimen was dipped in liquid sodium at 321°C. and allowed to remain for 10 minutes and then removed into an inert (helium) atmosphere. The specimen was then transferred into a lead bath at 362°C. under vacuum and allowed to soak for 10 minutes. The specimen was then removed and cooled to room temperature solidifying the lead coating on the specimen.

EXAMPLE 2

A bundle of S2 glass fibers was cleaned by washing in isopropyl alcohol and baked at 350°C. in air for 20 minutes. While under vacuum, the glass bundle was immersed in a sodium bath at 320°C. for 10 minutes and removed to a lead bath at 360°C. for 10 minutes. The thus treated fibers were then removed from the lead bath and allowed to cool to solidify the lead retained on the fibers.

EXAMPLE 3

In this example the glass was quartz glass and was treated by the same process as applied in example 2.

EXAMPLE 4

A strip (1 in. × 5 in.) of boatweave (coarse) tape, Owens-Corning Fiberglas Corp. Finish 172, without being subjected to precleaning, was immersed in liquid sodium at 309°C. for 5 minutes under vacuum. From the vacuum chamber it was transferred into a helium atmosphere and immersed in liquid lead at 356°C. for 10 minutes. After removal from the lead the tape and its lead coating were cooled.

The lead-glass composite formed by the present process consists of 45–50 volume percent glass and 55–50 volume percent lead. Axially of the fibers the composite has an average tensile strength (ultimate) of 30,000 psi. The creep rate of the composite is equal to that of glass alone thus indicating the components are integrally bonded.

It is to be understood that variations in the above described process may be practiced within the scope of the appended claims.

What is claimed is:

1. The method of coating glass fibers with lead comprising the steps of:
   a. contacting the surfaces of the glass fibers with liquid sodium; thereafter,
   b. immersing the glass fibers in a bath of liquid lead, and,
   c. removing the glass fibers from the liquid lead bath into an atmosphere at a temperature below the melting point of lead whereby to solidify the lead adhered to the surface of the glass fiber.

2. The method defined in claim 1 wherein,
   the liquid sodium is at a temperature of approximately 320°C., and the fibers are maintained in contact with the sodium for approximately 10 minutes.

3. The method defined in claim 1 wherein,
   the lead bath is at a temperature in the range of 340°C. – 370°C.

4. The method defined in claim 1 wherein,
   the glass fibers are heated at a temperature of approximately 350°C. in an oxygen containing atmosphere prior to the contacting with liquid sodium.

5. The method defined in claim 1 wherein,
   steps a. and b. are performed in an inert atmosphere.

* * * * *